Patented Jan. 9, 1951

2,537,013

UNITED STATES PATENT OFFICE 2,537,013

REFRACTORY BONDING METHOD AND REFRACTORIES PRODUCED THEREBY

Leslie W. Austin, San Jose, and James C. Hicks, Menlo Park, Calif., assignors to Kaiser Aluminum & Chemical Corporation, a corporation of Delaware No Drawing. Application June 20, 1947, Serial No. 756,099

23 Claims. (Cl. 106—59)

This invention relates to methods of bonding refractory materials in the form of grains into refractory products which are suitable for use at extremely high temperatures, and it relates to the products so prepared.

In high temperature metallurgical work the upper limit of the operating range is often set in practice by the temperature at which deterioration of the furnace lining becomes appreciable. There has been delay in putting into practice newer processes for working up ores for instance, because the operating temperatures are so high that refractories which have been available hitherto have exhibited excessive deterioration and have rendered such processes (for instance, some processes using oxygen in the production of iron and steel) impracticable. The deterioration is evidenced by softening under load, slagging of the refractories by the charge or by adjacent chemically incompatible materials, and by excessive spalling losses. Basic refractory materials, including the chromite and so-called magnesite refractories, are desirable for high temperature operation because of their high refractoriness and their resistance to corrosion by basic metallurgical products such as slags and basic oxides, but they have been notoriously unsatisfactory in regard to load bearing ability at high temperatures and in resistance to thermal spalling. These disadvantages as far as chromite bricks are concerned have been alleviated to some extent by the incorporation of approximately 30% of burned magnesite in finely divided form but at some sacrifice of chemical neutrality.

A definite need has been felt for a basic or neutral refractory which will withstand furnace conditions at 1700° C. or higher. Such a refractory having high-temperature load-bearing ability and good spalling resistance has a wide range of applicability, and is especially desired for use in furnace roofs, particularly for basic open hearth steel furnaces, and for roofs and linings for electric furnaces.

It is an object of the present invention to provide a method of bonding basic or neutral refractory grains into articles and furnace linings which are serviceable at high temperatures, particularly at temperatures of 1700° C. or above, or in other words, at temperatures which are in excess of those which are destructive to basic and neutral refractories now available in commerce. Further objects are to provide refractories having increased load-bearing ability at high temperatures, increased resistance to spalling and increased resistance to chemical attack.

The present invention is predicated upon the discovery that refractory products which will withstand the high temperature conditions described above are prepared by admixing basic or neutral refractory grain material with a bonding agent which comprises finely divided magnesia which is preferably low in silica content, and a chromium compound soluble in the liquid employed to temper the mixture which may be water, alcohol or other liquid.

The refractory grain materials which can be employed include all those which are compatible with magnesia at high temperatures, that is, those which avoid fluxing or slagging by reaction with magnesia, and therefore include, for example periclase, electrically fused magnesia, alumina, natural spinels such as chromite, picotite, etc., and manufactured spinels such as

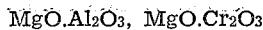

and other spinels, etc. It is, of course, necessary to employ a grain having a softening temperature in excess of that at which the refractory is to be used. In the practice of this invention, it is preferred to employ grain materials, as described above, containing not over about 4.0 of silica. With respect to grains from natural ores somewhat higher amounts of silica can be tolerated when the silica is not uniformly distributed, but is concentrated in a relatively few grains, the influence of which is masked or limited by the effect of a major proportion of the more highly refractory constituent which thus has an effective silica concentration of not over 4.0%. This is particularly noticeable with chromite ore, wherein, for example, 6% of silica can be tolerated because of the characteristic placement of the serpentine. It has been found that chromic acid or any of the soluble chromium salts, as further described below, give excellent results when admixed with grains which contain not more than 2.0% of silica, but where the grains contain the higher amounts of silica it is preferred to avoid the addition of any of the alkali chromium salts, such as potassium chromate, sodium bichromate, or the like, to avoid formation of low-melting alkali silicates. Thus, when using a chrome-ore grain, for example, with its associated siliceous impurities such as serpentine, it is preferable to add in the bond chromic acid, or the chromate or dichromate of magnesium or ammonium.

As soluble chromium compound there can be employed for example sodium chromate, sodium dichromate, potassium chromate, potassium dichromate, ammonium chromate, calcium chromate, magnesium chromate, chromic acid, or chromium chloride, nitrate or sulfate, or mixtures of these compounds. It has been observed that stronger air set and intermediate temperature bonds are apparently obtained when magnesium chromate is present, or those compounds which can yield magnesium chromate upon reaction in the cold with magnesia. Compounds which contain chromium in the positive or basic, radical are more difficult to use because the mixes so prepared set in air with great rapidity, but the air-set bond is very strong. It is preferred to add a chromium compound containing the chromium in the negative, or acid, radical, because these compounds give slower air set and tend to yield higher hot load strengths. The chrome compound can be employed in small amounts, for instance, in an amount adapted to yield from about 1/8% to 5% by weight of $Cr_2O_3$ based on the total dry ingredients in the preparation of bricks; somewhat more can be used in mixes requiring more water, for instance, to provide up to about 15% $Cr_2O_3$ in mortars or spray mixes and up to about 10% $Cr_2O_3$ in ramming mixes. In other words, while smaller amounts are useful, as stated, as much chromium compound can be added as will dissolve in the amount of water needed to plasticize the batch. That is to say, the chromium compound is added in an amount from that which yields 1/8% of $Cr_2O_3$, based on the total weight of dry ingredients up to that providing a saturated solution in the water, or other tempering liquid.

The magnesia employed in the bond should be of good purity and should be very finely divided, for instance, it preferably contains at least 96.0% magnesium oxide and is preferably finer than 200 mesh. The silica content of the magnesia should not exceed 4.0%, and preferably does not exceed 2.0% when the chromium compound of the bond is a chromium-containing salt of an alkali metal. The degree of burn is not critical, as good results are obtained even when the magnesia of the bond consists solely of finely ground dead-burned magnesia, or periclase. However a highly active magnesia may cause excessively rapid setting on the bond. The fine magnesia is employed in an amount at least sufficient to form $MgO.Cr_2O_3$, magnesio-chromite, with all the chromium of the soluble chromium compound. Considerable excess above this amount is normally employed to impart the desired plasticity to the batch; in general about 10% of magnesia is a workable minimum, and the amount may range up to 40% or even more in special cases. The additional amounts of magnesia also serve to aid in the formation of the chemical bond and in some cases to convert lower melting secondary components of natural ores into more refractory compounds.

It is preferred that all fluxing constituents in the refractory grains and in the bonding materials be kept as low as possible, especially the siliceous constituents, and more particularly, alumina associated with silica.

Preferably the chrome compound and the magnesia are intimately interdispersed. Dispersion of the chromic acid or chrome salt is most conveniently effected by adding it as a solution in water. This is suitably done by adding it as a solution in the water used to temper the mix. However, when it is desired to prepare a dry mix, such as a mortar or ramming mix, to which water is to be added at the time of use, the finely divided chromium compound can be dispersed in the dry mixture of solid ingredients, or it can be provided separately and added as a solution in the mixing water. The magnesia is suitably pulverized to finer than 200 mesh and blended carefully into the batch, in order to secure its adequate dispersion. It has been found that the bond strengths increase in proportion to the increase in fineness, i. e., to decrease in particle size, of the magnesia which combines with the chromic acid or chrome salt to form the bond. The chromium compound-magnesia bond can also be used in combination with other chemical bonds, as for instance, with magnesium oxychloride or magnesium oxysulfate bonds to provide higher cold strengths, especially when using lower amounts of the chromium compound.

In preparing chemically bonded articles sufficient water must be incorporated into the mix to satisfy the water-of-crystallization requirements of the salt formed by reaction of the soluble chrome compound and the magnesia of the bond. In some cases the salt or salts formed by the reaction contains or has the ability to contain much more water of crystallization than the starting salt. If insufficient water for this purpose is present in the mix, prior to pressing a shaped article, for instance, moisture may be extracted from the air upon standing in a moist atmosphere, and the result may be swelling, weakening of the bond, or crumbling of the formed article.

In carrying out the method of this invention, the grain material selected for the aggregate of the refractory is crushed and ground and the quantities of varying sizes are proportioned so as to yield the necessary plasticity and yet to provide a dense, strong body upon pressing. Preferably, the sized grain material is blended in a suitable mixer and then wetted with a water solution of the desired chrome compound, mixing being continued until the grains are uniformly wet. At this stage very finely powdered magnesia is blended in until the moistened grains are uniformly coated. The batch is then ready for pressing into shaped articles or for ramming into place in a furnace bottom, for instance. If pressed articles are to be made, the pressing is carried out at a high unit pressure, for instance, at 5,000 to 10,000 lbs. per square inch or more. The shapes are then set aside to harden, which usually requires a few hours, and may then be dried in the usual manner to produce articles having good chemical bonds. Alternatively, the articles can be fired to 1200° C. or higher to produce outstanding burned refractories. In another variation the dry ingredients can be proportioned and blended, packed in moisture-proof containers, and supplied as ramming and moulding or mortar mixes, to be mixed with water just prior to use.

It has been found that refractories prepared as described have exceptional high-temperature strength and spalling resistance; and also that chemical bonds of very good strength are formed which remain strong and serviceable upon firing to intermediate temperatures. It is thus possible to make very satisfactory chemically bonded refractories, which may if desired be installed in the furnace without previous kiln firing and which will nevertheless withstand temperatures as much as 200° C. or even more, above the failure temperatures of the best corresponding refractories at present available to industry.

As had been stated, one of the advantages of the refractories of the present invention is the chemical bond thereof which retains exceptional strength even after firing to intermediate temperatures. Chemical bonds of the prior art which exhibit good strengths at low temperatures become quite weak when fired to intermediate temperatures. For example, a refractory composition bonded with magnesium oxychloride shows a crushing strength of only 1,000 lbs. per square inch after firing to 800° C. A composition which is the same in all respects except that it is bonded by the method of this invention, i. e., by the addition of a soluble chrome compound, as described, and magnesia, has a crushing strength of over 4,000 lbs. per square inch after firing to the same temperature. It is believed that the strength of the chemical bond of this invention may result from the formation of a magnesium oxychromate, corresponding to the magnesium oxychloride and magnesium oxysulfate cements. This theory is based not only on the observation of the greater strength but also on the results of physical examination of prepared specimens of the bond composition as will be described below.

The bond is extremely good for load-bearing ability at very high temperatures. For example, with high-purity magnesia grain material, test specimens have reached as high as 1970° C. before failure by shear under load of 25 pounds per square inch. For comparison, the average magnesite brick fails on this test below 1550° C., and the best magnesium orthosilicate bonded magnesia brick at 1800° C. Chrome-magnesia refractories made according to the invention have reached 1760° C. as compared to the average commercial chrome-magnesia brick which fail at about 1500° C.

A further specific advantage of the invention is that an excellent bond is provided for electrically fused magnesia grains, which have been notoriously difficult to bond for use at high temperatures. For comparison, identical compositions of electrically fused magnesia grains were bonded with magnesium oxychloride and with the bond of this invention. Under load of 25 pounds per square inch, the oxychloride bonded specimen failed by shear at 1420° C., whereas, on an identical test the chrome bonded specimen prepared according to the method of this invention had but 2.0% linear deformation after cooling from 1855° C. maximum temperature.

The resistance to thermal spalling provided by the bonding method of this invention is also particularly noteworthy, as exemplified in the table below in which are reported the results of a very severe spalling test as applied to bricks bonded according to the invention and to representative commercial refractories. Table I shows the superiority of bricks made according to the invention. It is especially to be noted that, by employing the chrome compound-magnesia bond the spalling resistance of magnesia bricks is so improved as to equal that of the best commercial chrome-magnesia brick.

The spalling test employed is as follows: Bricks measuring 9 x 4½ x 3 inches or 9 x 4½ x 2½ inches are laid as stretcher courses in a panel. The cold side and ends are covered with insulating firebrick and the face to be tested is exposed to heat, by placing it, cold, directly in front of an open testing furnace for sufficient time to raise the hot-face temperature of the panel to 1400° C. The panel is then removed from the heat source and blasted with cold air for 15 minutes. Alternate heating to 1400° C. in 15 minutes and air blasting for 15 minutes are repeated to make a total of 10 cycles. The spalling loss is determined as the percent by weight of the total brick after cooling, which can be broken off by the fingers unaided by tapping, prying etc. In the table, results are shown of spalling tests on bricks tested without pre-firing ("chemically bonded") and on bricks which have been pre-fired.

Table—Spalling losses

| Product | Loss, Per cent by weight | |
| --- | --- | --- |
| | Chemically Bonded | Pre-fired |
| Magnesia brick, according to the invention | 2.0 | 15.3 |
| Best commercial periclase brick | 18.2 | 21.3 |
| Average commercial magnesite brick | 24.1 | 25.9 |
| Chrome brick, according to the invention | 3.4 | 15.7 |
| Chrome-magnesia brick, according to the invention | 3.1 | 11.0 |
| Best commercial chrome-magnesia brick | 12.1 | 15.6 |
| Average commercial chrome-magnesia brick | 14.2 | 25.3 |

In addition to the above advantages, the new bonds of the invention in combination with low-silica periclase grain material (not more than 2.0% silica) yield a magnesia refractory with remarkable resistance to chemical attack by acidic fluxing agents such as alumina and silica.

To more clearly illustrate the practice of the invention some specific examples are given below. These are but a few of the ways the invention may be practiced, and the examples are not intended to be limiting in any way. The invention comprises bonding grains with magnesia and a soluble chromium compound.

An excelent magnesia refractory is prepared according to the following example. Compositions prepared in this manner have given hot load results averaging better than 1900° C. for shear of a 2¼" dia. by 3½" pellet under load of 25 pounds per square inch. The grain material used is a well crystallized but non-fused magnesia, analysing approximately 97% MgO, 1.25% silica, 1.25% CaO, balance iron and aluminum oxides, etc. This material is crushed and ground and proportioned to yield a suitable refractory batch, for example, so that 32% is finer than 100-mesh, 55% is finer than 20-mesh, and the whole is finer than 6-mesh. These grains are blended in a wet-pan mixer with a solution of 2 parts by weight sodium dichromate in 4 parts by weight water per 100 parts by weight of grain. When the grains are uniformly moistened they are coated uniformly with ten parts of finely powdered hard-burned magnesia. The batch is then pressed into shapes at pressures of the order of 10,000 pounds per square inch, allowed to harden for a few hours, and then dried at about 350° F. In some cases the hardening and drying process may be hastened by steam curing in an autoclave at elevated temperature and pressure. If desired, a burned refractory may be produced by firing at 1200° or higher. The lower temperatures of firing yield bricks which have satisfactory strength for shipment or use, and which have better spalling resistance than those fired to higher temperatures such as 1600° C. or more.

In another example, a chrome-magnesia brick is prepared as follows. The chromite selected should preferably be one low in silica, although satisfactory results have been obtained with an ore averaging from four to six percent in silica. The chromite is crushed and sized and used in the following batch:

| | Parts by weight |
|---|---|
| Chromite, minus 6, plus 14-mesh | 50 |
| Chromite, minus 14, plus 20-mesh | 10 |
| Chromite, minus 20, plus 40-mesh | 10 |
| High-purity periclase, minus 20, plus 40-mesh | 10 |
| High-purity periclase, minus 200 | 20 |
| Hard-burned magnesia, minus 200 | 10 |
| Magnesium chromate | 4 |
| Water | 3 |

The chromite and periclase are blended and wet with the magnesium chromate in solution in the water, as were the grains in the previous example, and the hard-burned magnesia is added at the last to coat the moistened grains. The batch is pressed, and may be cured and dried as in the last example and fired if desired. Chemically bonded bricks prepared according to this example have gone to 1760° C. on the hot load test. Additional high-purity periclase (97% MgO) may replace the hard-burned magnesia in this example, if desired.

An unusually good chrome brick, combining the chemical neutrality of chrome with the load bearing ability of the chrome-magnesia bricks, is prepared as follows. A good chromite, such as employed in the last example, having a silica analysis preferably under four percent, is crushed and ground to the proper sizes for a complete refractory batch. For example, the following proportions may be used: 4-mesh to 14-mesh, 40 parts by weight; 14-mesh to 40-mesh, 20 parts; ball-milled portion, substantially finer than 200-mesh, 28 parts. The 88 parts of grain material is blended in a wet-pan type mixer, and then uniformly wetted with a solution of 0.75 part by weight of chromic acid in 2 to 3 parts by weight of water (the water employed being adjusted to give the proper consistency to the batch for pressing). To the moistened grains are added 10 parts of hard-burned magnesia or periclase of a purity of 96% or better and which is substantially finer than 200 mesh. The mix is uniformly blended and is then pressed into the desired shapes. These shapes may be allowed to harden and then be dried at about 350° F. to be used as chemically bonded refractories, or they may be fired before use as in the previous examples. If desired, the chromic acid solution may be allowed to react prior to mixing in the batch with a portion of the magnesia sufficient to form magnesium chromate with the acid used. The balance of the magnesia would then be added dry to the batch after the incorporation of the chromate solution. Bricks so prepared have excellent hot load strength and improved spalling characteristics.

As an example of preparing a refractory mortar according to this invention, 88% by weight of chromite ground to pass 40 mesh, 10% by weight of periclase, or of magnesia burned to less than 0.3% ignition loss, ground to pass 200 mesh, and 2% of potassium dichromate are intimately mixed together. The mixture may be stored or shipped in moisture-proof containers, and water is added at the time of use, whereupon the dichromate is dissolved and more thoroughly dispersed. Other non-acid grain materials can be used in place of the chromite. These mortars exhibit improved refractoriness and improved bonding action, with increased resistance to erosion at high temperatures.

As stated above, many variations in technique over these few examples will be apparent to those skilled in the art without departing from the spirit and scope of the appended claims. Improved refractories are also prepared by incorporating the bonds of this invention in mixes with refractory grains other than those mentioned above, for example with fused magnesia, zirconia, alumina, magnesia-chrome, or magnesia-alumina spinel grains. In mixes containing zirconia or alumina grains as the principal refractory material, it is preferred to avoid the addition of alkali chromates.

One source, worthy of particular mention, of grain material for use with the invention is the re-use of old refractories, especially those from extremely high temperature operations, such as pebble stoves, nitrogen fixation furnaces or the like. It is not only a matter of great economy to be able to recover and re-use the relatively expensive refractory grains which are suitable for such high temperatures, but the long heating which such materials undergo in service gives them a degree of crystallization and a stability which is otherwise difficult and uneconomic to attain. The invention allows such materials to be re-crushed and sized and then re-bonded into refractories at least as satisfactory as the originals. For best results the same standards of purity as with the new materials are observed, and refractories contaminated with fluxes or slags must be carefully sorted out of the good materials.

The manner of operation of the bond of the invention is not completely understood and it is therefore not desired to be limited by the following hypotheses, which are set forth as a possible further aid to those interested in applying and understanding the invention. At least one important function of the chrome compound seems to be to act as a mineralizer, allowing recrystallization and crystal growth in the excess magnesia of the bond to take place more rapidly or at lower temperatures, especially in the substantial absence of silica, than would be possible in magnesia material of the same purity without the chrome compound. Unusually large crystals of periclase, for example, have been found in magnesia bricks bonded according to this invention. The bond provides benefit to the refractory at all stages of its service. A strong and rapidly formed chemical bond is provided, especially in the presence of magnesium chromate with the magnesia. It is postulated that the chemical bond may be a magnesium oxychromate which would appear to act as a cement or binder analogous to magnesium oxychloride or magnesium oxysulfate cement. This theory is based not only upon observation of the strengths of the bond but upon physical investigation of a bond composition prepared by mixing 10 parts by weight of magnesia, 2 parts by weight of magnesium chromate and 3 parts by weight of water and allowing the mix to stand at room temperature until hard. The product exhibits unidentified X-ray diffraction lines and also unidentified crystals which are not crystals of magnesia nor of magnesium chromate.

Upon heating to about 200° C. the bond of this invention becomes even stronger, gradually losing strength to a minimum at about 600° C. During this period the bond is losing water, and perhaps converting to magnesium chromate, but even at the lowest point its strength is in general markedly higher than the strengths of other known bonds for the same grain materials. Upon further heating magnesium chromate breaks down to magnesium oxide and magnesium chromite, the spinel. The change starts at about 800° C. and is marked by a change in color and a rapid rise in strength of bond. In general, by about 1000° to 1100° C. the bond has regained its original strength. At this time it may be that magnesium chromite spinel and recrystallized magnesium oxide at least begin to constitute the bond, and further heating to higher temperatures more fully develops this crystalline, highly refractory bond.

At least part of the chromium, possibly as $Cr_2O_3$, appears to go into solid solution in the magnesia of the bond, as well as in a magnesia grain, and it is thought that this ease of migration of the chrome may partially explain its apparent benefit as a mineralizer. The importance of this mineralizing action lies in the fact that at no time during the process of forming the ceramic bond is an excessive amount of liquid phase developed in the bond, and therefore the bond is strong at all times up to the final softening temperature. The eutectic between magnesia and magnesium chromite melts at about 2050° C., which is 200° C. higher than the melting point of the eutectic between magnesia and magnesium orthosilicate. For this reason, and also because of the mobility of silica in refractories at temperatures in excess of about 1600° C., it is desirable and advantageous to limit the silica content of the refractory composition as discussed above, especially in the bond component. It is also desirable to employ materials which are low in compounds which act as fluxes, perhaps with formation of lower melting silicates, such compounds that is, as lime, $Fe_2O_3$, $B_2O_3$ and finely divided $Al_2O_3$, in order to obtain the full effect of the high-melting chrome-containing bond in the fired products. Advantageously a small part of the magnesia constituent of the bonding component can be added in the form of a precipitated magnesium compound yielding magnesia upon heating, for instance, magnesium carbonate or magnesium hydroxide. Apparently due to the extremely fine particle size or active nature of the magnesia formed upon heating the magnesia-yielding compound, the formation of the mineral bond by reaction with the chrome compound is facilitated. Only a small proportion of the convertible magnesium compound, for instance, not over 3.0%, based on the weight of the total dry ingredients is added, to avoid excessive shrinkage. Further advantages of adding the precipitated material, which is finely divided, are that it lubricates the mix during forming and effects a denser structure, and that it initiates formation of the mineral bond at lower temperature.

For convenience, the grain materials are defined in the claims as non-acid, and this term is intended to include basic and neutral grains. The chromium compounds can be suitably dispersed not only in water solution but in solution in any liquid solvent therefor, such as a lower aliphatic alcohol such as methyl or ethyl alcohol, or other solvent. In the specification and claims all percentages and parts are by weight. In conformity with common practice in reporting chemical analyses of refractory materials, in the specification and claims the proportions of the various chemical constituents present in a material are expressed as though these constituents were present as the simple oxides. Thus, the magnesium constituent is expressed as magnesium oxide or MgO, the chromium constituent as $Cr_2O_3$, the silicon constituent as $SiO_2$ and so on, although the silica or chrome and a small proportion of the MgO, for example, may be present in combination with each other or with another minor constituent.

What is claimed is:

1. Process of preparing a shaped refractory composition which comprises mixing in a batch non-acid grain material containing not more than 4.0% silica and as bonding agent finely divided magnesia containing not more than 4.0% silica and a solution of a chromium compound in a tempering amount of water, said chromium compound being added in an amount from that which yields 1/8% by weight of $Cr_2O_3$ in the total dry ingredients up to an amount which provides a saturated solution of said chromium compound in said water, said fine magnesia being added in at least an amount to form upon firing magnesium chromite with all of said soluble chromium compound, and shaping the batch.

2. Process as in claim 1 wherein the grain material is periclase.

3. Process as in claim 1 wherein the grain material is chromite.

4. Process as in claim 1 wherein the grain material comprises a mixture of periclase and chromite.

5. Process as in claim 1 wherein the chromium compound is a dichromate of an alkaline earth metal.

6. Process as in claim 1 wherein the chromium compound is magnesium chromate.

7. Process as in claim 1 wherein the chromium compound is chromic acid.

8. Process of preparing a refractory mortar which comprises mixing non-acid grain material containing not more than 4.0% silica, water, and as bonding agent finely divided magnesia and a water-soluble compound of chromium in an amount from that which yields 1/8% by weight of $Cr_2O_3$ based on the total weight of dry ingredients up to an amount which provides a saturated solution of said chromium compound in said water, said magnesia being added in at least an amount to form upon firing magnesium chromite with all of said soluble chromium compound.

9. Process of preparing a refractory ramming mix which comprises mixing non-acid grain material containing not more than 4.0% silica, water, and as bonding agent from 10% to 40% finely divided magnesia and a water-soluble compound of chromium in an amount from that which yields 1/8% by weight of $Cr_2O_3$ based on the total weight of dry ingredients up to an amount which provides a saturated solution of said chromium compound in said water.

10. A refractory composition comprising as its principal refractory ingredient non-acid grain material containing not more than 4.0% silica, and as bonding ingredients finely divided magnesia containing not more than 4.0% of silica, and a chromium compound soluble in a liquid tempering agent for said composition, said chromium compound being present in an amount from that which yields 1/8% of $Cr_2O_3$ based on the total weight of dry ingredients up to that providing a saturated solution in said tempering liquid, and said fine magnesia being present in at least an amount to form upon firing magnesium chromite with all of said chromium compound.

11. A refractory composition comprising as its principal refractory ingredient non-acid grain material containing not more than 2.0% of silica, and as bonding ingredients finely divided magnesia containing not more than 2.0% of silica, and a water-soluble chromium compound, said chromium compound being present in an amount from that which yields ⅛% of $Cr_2O_3$ based on the total weight of dry ingredients up to that providing a saturated solution in said tempering liquid, and said fine magnesia being present in at least an amount to form upon firing magnesium chromite with all of said chromium compound.

12. Composition as in claim 11 wherein the chromium compound is alkali dichromate.

13. Composition as in claim 11 wherein the chromium compound is chromic acid.

14. Composition as in claim 11 wherein the chromium compound is magnesium chromate.

15. A refractory composition comprising as its principal refractory ingredient non-acid grain material containing not more than 4.0% silica, and as bonding ingredients from 10% to 40% of finely divided magnesia containing not more than 4.0% silica and a water-soluble chromium compound free of alkali metal compounds, said chromium being present in an amount to provide from ⅛% to 15% of $Cr_2O_3$ based on the total weight of dry ingredients.

16. Composition as in claim 15 wherein the grain material is periclase.

17. Composition as in claim 15 wherein the grain material is chromite.

18. Composition as in claim 15 wherein the grain material comprises a mixture of chromite and periclase.

19. An unfired refractory article comprising as its principal refractory ingredient non-acid grain material, and as bonding agent magnesium oxychromate.

20. Process of preparing a fired refractory composition which comprises mixing in a batch non-acid grain material containing not more than 4.0% silica and as bonding ingredients from 10% to 40% finely divided magnesia containing not more than 4.0% silica, a liquid, and a chromium compound soluble in said liquid and in an amount from that which yields ⅛% by weight of $Cr_2O_3$ in the total dry ingredients up to that which provides a saturated solution of said chromium compound in said liquid, shaping the batch, and firing at a temperature of at least 1200° C.

21. A refractory composition comprising as its principal refractory ingredient non-acid grain material containing not more than 4.0% silica, and as bonding ingredients from 10% to 40% finely divided magnesia containing not more than 4.0% silica, and a chromium compound soluble in a liquid tempering agent for said composition, and not over 3% of a precipitated magnesium compound yielding magnesia upon heating, said chromium compound being added in an amount which provides from ⅛% to 15% of $Cr_2O_3$ based on the total weight of dry ingredients.

22. In the process of preparing a shaped refractory composition the step which comprises mixing in a batch non-acid grain material and as bonding agent finely divided magnesia and a solution of a chromium compound in a tempering amount of liquid, said chromium compound being added in an amount from that which yields ⅛% by weight of $Cr_2O_3$ in the total dry ingredients up to that which provides a saturated solution of said chromium compound in said tempering liquid, said finely divided magnesia being added in at least an amount to form upon firing magnesio-chromite with all of said soluble chromium compound.

23. A refractory composition comprising as its principal refractory ingredient non-acid grain material, and as bonding ingredients finely divided magnesia and a chromium compound soluble in a liquid tempering agent for said composition, said chromium compound being present in an amount from that which yields ⅛% of $Cr_2O_3$ based on the total weight of dry ingredients to that which will provide a saturated solution in said tempering liquid, and said finely divided magnesia being present in at least an amount to form upon firing magnesio-chromite with all of said chromium compound.

LESLIE W. AUSTIN.
JAMES C. HICKS.

REFERENCES CITED

The following references are of record in the file of this patent:

UNITED STATES PATENTS

| Number | Name | Date |
|---|---|---|
| 1,853,521 | Stewart | Apr. 12, 1932 |
| 1,853,522 | Stewart | Apr. 12, 1932 |
| 2,053,369 | Jeffery | Sept. 8, 1936 |
| 2,234,080 | Mitchell et al. | Mar. 4, 1941 |